(12) United States Patent
Vialpando et al.

(10) Patent No.: US 9,480,344 B1
(45) Date of Patent: Nov. 1, 2016

(54) BIMODAL CHILD CARRIER

(71) Applicants: Eric Vialpando, Murrieta, CA (US); Jennifer Vialpando, Murrieta, CA (US)

(72) Inventors: Eric Vialpando, Murrieta, CA (US); Jennifer Vialpando, Murrieta, CA (US)

( * ) Notice: Subject to any disclaimer, the term of this patent is extended or adjusted under 35 U.S.C. 154(b) by 0 days.

(21) Appl. No.: 14/938,107

(22) Filed: Nov. 11, 2015

(51) Int. Cl.
*A47D 13/02* (2006.01)

(52) U.S. Cl.
CPC .................................. *A47D 13/025* (2013.01)

(58) Field of Classification Search
CPC ............................ A47D 13/02; A47D 13/025
USPC ................................................ 224/158–162
See application file for complete search history.

(56) References Cited

U.S. PATENT DOCUMENTS

| | | | | |
|---|---|---|---|---|
| 5,178,309 A | * | 1/1993 | Bicheler | A47D 13/025 224/153 |
| 5,243,724 A | * | 9/1993 | Barnes | A41B 13/06 2/69.5 |
| 5,333,769 A | * | 8/1994 | Skroski | A47D 5/006 224/148.5 |
| 5,772,088 A | * | 6/1998 | Nelson | A47D 13/025 224/158 |
| 6,325,259 B1 | * | 12/2001 | Tharalson | A47D 13/025 224/159 |
| 8,936,314 B2 | * | 1/2015 | Lai | A47D 1/10 224/158 |
| 9,357,852 B2 | * | 6/2016 | Salazar | A47D 13/025 |
| 9,386,863 B1 | * | 7/2016 | Antunovic | A47D 13/02 |
| 2006/0138826 A1 | * | 6/2006 | Caton | A47D 13/02 297/256.16 |
| 2008/0313812 A1 | * | 12/2008 | Reeves | A47D 13/02 5/655 |
| 2014/0292049 A1 | * | 10/2014 | St. Pierre | A47D 13/02 297/256.16 |
| 2014/0346200 A1 | * | 11/2014 | Strickland | A47D 13/02 224/158 |
| 2015/0223614 A1 | * | 8/2015 | Pos | A47D 13/025 224/158 |

FOREIGN PATENT DOCUMENTS

| | | | | | |
|---|---|---|---|---|---|
| GB | 2490157 A | * | 10/2012 | | |
| GB | 2512085 A | * | 9/2014 | | B60N 2/2845 |
| KR | 200459848 Y1 | * | 4/2012 | | A47D 13/025 |
| NO | EP 1175858 A2 | * | 1/2002 | | A47D 13/02 |
| WO | WO2006125255 A1 | * | 11/2006 | | |

* cited by examiner

*Primary Examiner* — Justin Larson
(74) *Attorney, Agent, or Firm* — Clement Cheng

(57) ABSTRACT

A bimodal child carrier has a middle panel having a middle panel upper end and a middle panel lower end. The middle panel has a right shoulder belt flap extending from a right side of the middle panel and a left shoulder belt flap extending from a left side of the middle panel. A user left shoulder strap is attached to the left shoulder belt flap, and a user right shoulder strap is attached to the right shoulder belt flap. A side panel is connected to the middle panel lower end. A chest panel is connected to the middle panel at the middle panel lower end. A left side strap is connected to the middle panel. The left side strap terminates in a left side strap first connector. A left side strap second connector is connected to the chest panel.

13 Claims, 5 Drawing Sheets

BIMODAL CHILD CARRIER

FIELD OF THE INVENTION

The present invention is in the field of bimodal child carrier.

DISCUSSION OF RELATED ART

A variety of different infant carriers can convert to multiple modes and have different configurations for different functions. For example, infant carriers now marketed as travel systems can function as both a car seat and a stroller. Infant carriers have also been combined with harnesses such as described by Bicher in U.S. Pat. No. 5,178,309 issued Jan. 12, 1993 entitled Infant Carrier And Harness Combination, the disclosure of which is incorporated herein by reference. Additionally, U.S. Pat. No. 5,243,724 issued Sep. 14, 1993 to inventor Barnes entitled Multipurpose Baby Wrap, the disclosure of which is incorporated herein by reference, provides for a sheet that converts to a bunting, then a blanket and then a sling. In United States patent publication 20040074937 published Apr. 22, 2004 to inventor Thomas, entitled Combination Backpack And Child Seat For A Vehicle, the disclosure of which is incorporated herein by reference, provides for a car seat that converts to a backpack. A variety of different car seat adapters can provide additional functionality to child car seats. For example, Schropfer in U.S. Pat. No. 8,256,839 issued Sep. 4, 2012 entitled a method of protecting an infant or toddler from both Sun's rays and from overheating in warm weather, provides for a method of protecting an infant or toddler from both Sun's rays and from overheating in warm weather using a bunting or muff like device that fits over a cg seat.

SUMMARY OF THE INVENTION

A bimodal child carrier has a middle panel having a middle panel upper end and a middle panel lower end. The middle panel has a right shoulder belt flap extending from a right side of the middle panel and a left shoulder belt flap extending from a left side of the middle panel. A user left shoulder strap is attached to the left shoulder belt flap, and a user right shoulder strap is attached to the right shoulder belt flap. A side panel is connected to the middle panel lower end. A chest panel is connected to the middle panel at the middle panel lower end. A left side strap is connected to the middle panel. The left side strap terminates in a left side strap first connector. A left side strap second connector is connected to the chest panel. The left side strap first connector is configured to releasably connect with the left side strap second connector. A right side strap is connected to the middle panel, and the right side strap terminates in a right side strap first connector. A right side strap second connector is connected to the chest panel, and the right side strap first connector is configured to releasably connect with the right side strap second connector. A right shoulder strap releasably connects the middle panel upper end to the chest panel. A left shoulder strap releasably connects the middle panel upper end to the chest panel. A right shoulder belt opening defined between the middle panel and the right shoulder belt flap; a left shoulder belt opening is defined between the middle panel and the left shoulder belt flap. A middle belt opening is formed below the middle panel upper end.

The middle belt opening is formed on the side panel. A user left shoulder strap is attached to the left shoulder belt flap, and a user right shoulder strap attached to the right shoulder belt flap. The left shoulder belt flap has a left shoulder strap flap pocket, and the left shoulder strap flap pocket holds the user left shoulder strap. The right shoulder belt flap has a right shoulder strap flap pocket. The right shoulder strap flap pocket holds the user right shoulder strap. The bimodal child carrier optionally also includes a left pocket zipper on the left shoulder strap flap pocket. Also, the right shoulder strap flap pocket has a right pocket zipper. The left pocket zipper encloses the left shoulder belt flap within the left shoulder strap flap pocket. The right pocket zipper encloses the right shoulder belt flap within the right shoulder strap flap pocket.

The chest panel has a central cut out with a central cut out left edge and a central cut out right edge. The right side strap connects to the central cut out right edge. The left side strap connects to the central cut out left edge. The right side strap crosses across the right shoulder strap when the right shoulder strap is engaged between the chest panel and the middle panel when the right side strap is engaged between the chest panel and the middle panel. The left side strap crosses across the left shoulder strap when the left shoulder strap is engaged between the chest panel and the middle panel when the left side strap is engaged between the chest panel and the middle panel. A left or right side of the side panel has a user waist strap connected to it. The user waist strap has a user waist strap first connector that removably connects to a user waist strap second connector. The user waist strap second connector is connected opposite the user waist strap.

Figure 1:
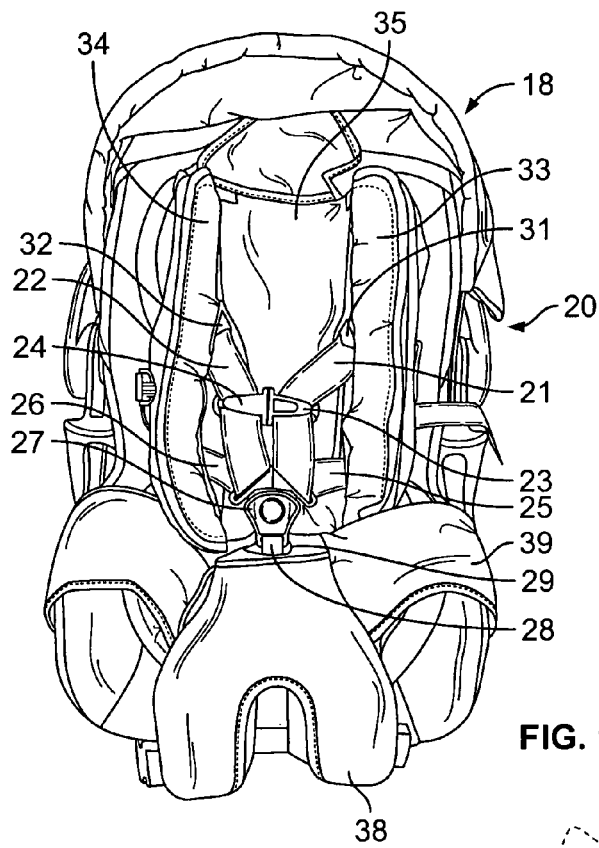
FIG. 1 is a front view of the present invention installed on a car seat.
Figure 2:
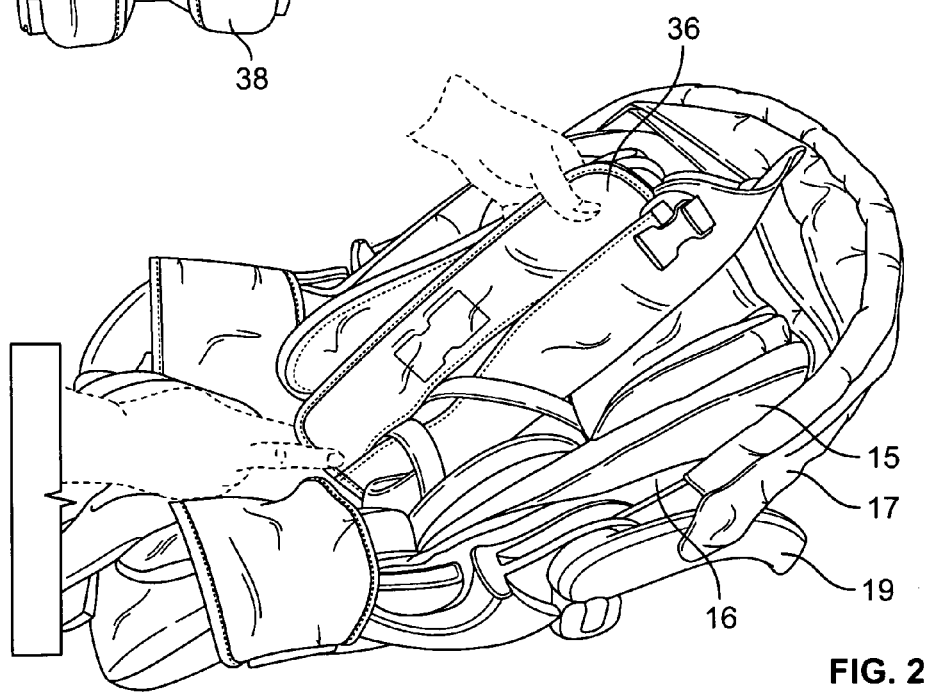
FIG. 2 is a side perspective view of the present invention installed on a car seat.
Figure 3:
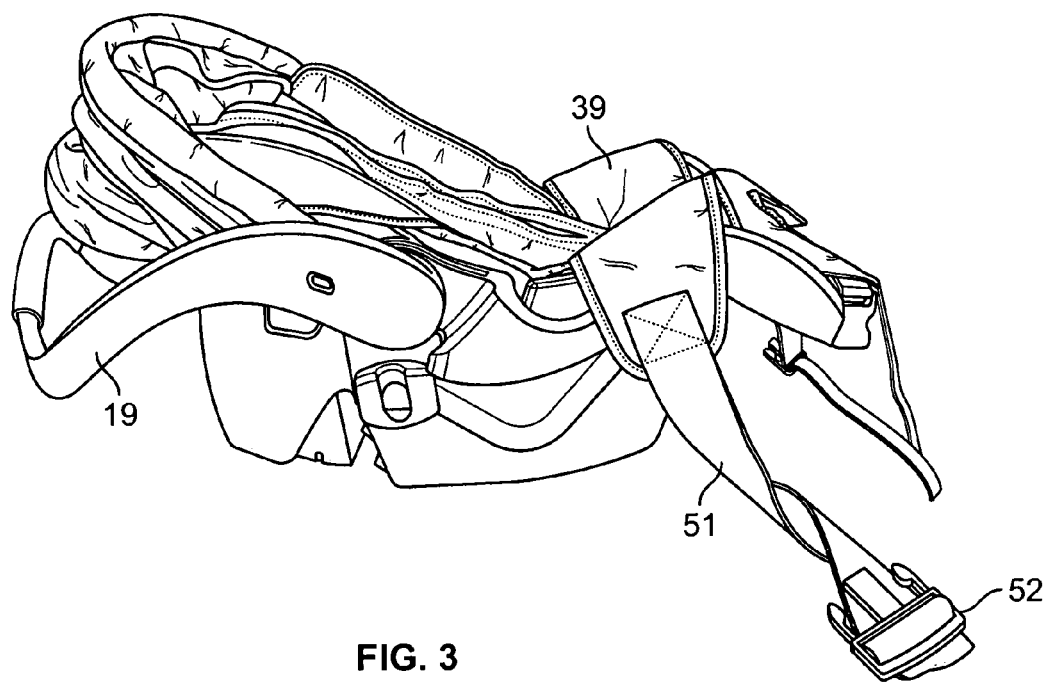
FIG. 3 is a side view of the present invention installed on the car seat.
Figure 4:
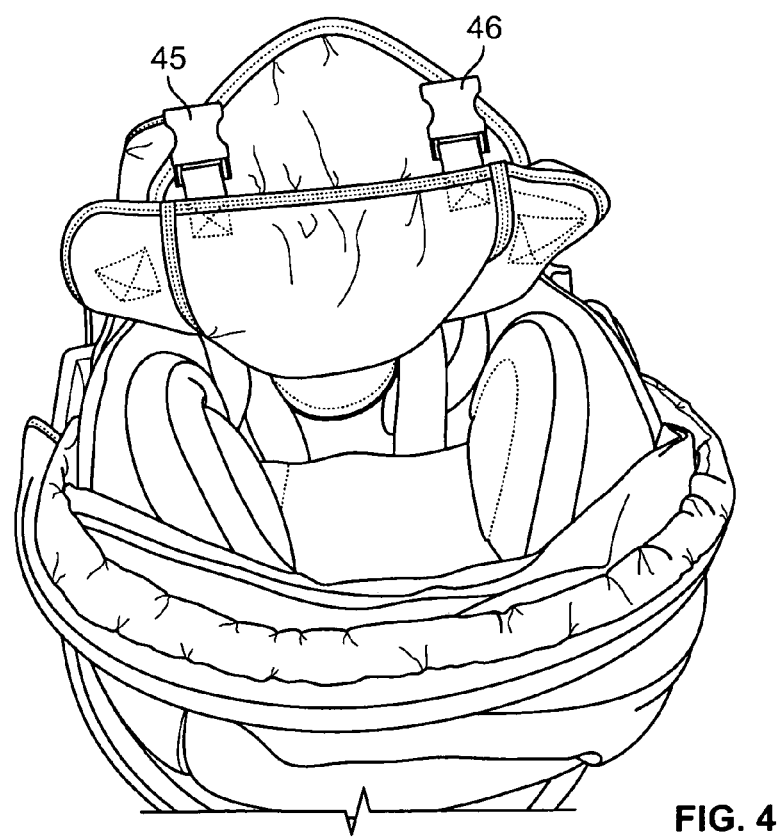
FIG. 4 is a top view of the present invention installed on a car seat with an upper end of the carrier folded down.
Figure 5:
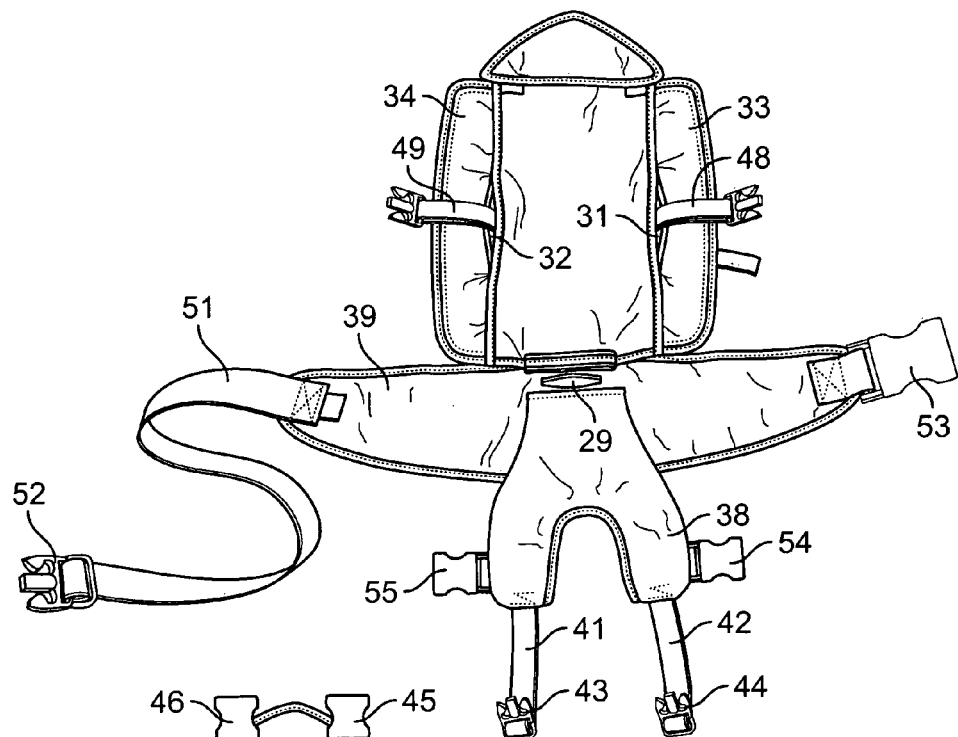
FIG. 5 is a front view of the present invention.
Figure 6:
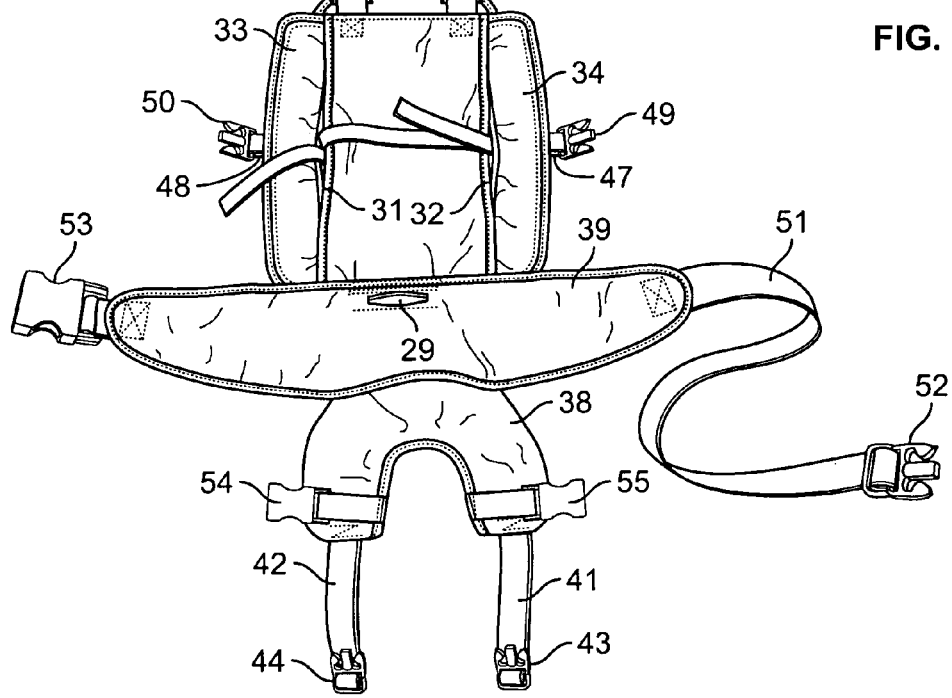
FIG. 6 is a rear view of the present invention.

The following call out list of elements can be a useful guide in referencing the element numbers of the drawings.
15 car seat cushion
16 car seat frame
17 car seat shade
18 car seat
19 car seat handle
20 five point harness
21 right shoulder belt
22 left shoulder belt
23 right shoulder belt clasp
24 left shoulder belt clasp
25 right lap belt
26 left lap belt
27 middle belt connector
28 middle belt
29 middle belt opening 31 right shoulder belt opening
32 left shoulder belt opening
33'right shoulder belt flap
34 left shoulder belt flap
35 middle panel
36 user right shoulder strap flap pocket
37 user left shoulder strap flap pocket
38 chest panel
39 side panel
41 left shoulder strap
42 right shoulder strap
43 left shoulder strap first connector
44 right shoulder strap first connector
45 left shoulder strap second connector
46 right shoulder strap second connector
47 left side strap
48 right side strap
49 left side strap first connector
50 right side strap first connector
51 user waist strap
52 user waist strap first connector
53 user waist strap second connector
54 right side strap second connector
55 left side strap second connector
56 user right shoulder strap
57 user left shoulder strap
58 right pocket zipper
59 left pocket zipper
60 upper back shoulder straps
61 upper back shoulder strap connector
62 upper back shoulder strap left connection area
63 upper back shoulder strap right connection area

DETAILED DESCRIPTION OF THE
PREFERRED EMBODIMENT

A child such as an infant or toddler typically needs a carrier when a user such as a parent needs to carry the child. The present invention can be adapted for a an infant or toddler. The present invention is a bimodal infant carrier that fits onto a car seat having a five point harness.

The car seat cushion 15 provides a fabric layer for cushioning the infant from the car seat frame 16 which is usually rigid plastic. The car seat 18 may have a car seat shade 17 pivotally attached to the car seat 18. A car seat handle 19 can also be pivotally attached to the car seat frame 16. The car seat also has a five point harness for retaining the child. The five point harness 20 includes a right shoulder belt 21 and a left shoulder belt 22. The right shoulder belt is connected to the left shoulder belt where the right shoulder belt clasp 23 connects to the left shoulder belt clasp 24. The right shoulder belt 21 continues to a right lap belt 25 and the left shoulder belt 22 continues to a left lap belt 26. The left lap belt 26 is connected to the right lap belt 25 at a middle belt connector 27. The middle belt connector 27 is connected to a middle belt 28.

The infant carrier has three openings for receiving belts of the five point harness, namely the middle belt opening 29 located below the right shoulder belt opening 31 and the left shoulder belt opening 32. A reinforcement strip longer than the middle belt opening 29 and parallel to the middle belt opening 29 can connect the side panel 39 to the middle panel 35. The side panel 39 extends leftward and rightward sideways so that the side panel 39 is wider than the middle panel 35. The side panel 39 is connected below the middle panel at a lower edge of the middle panel 35 and an upper edge of the side panel 39. The right shoulder belt opening 31 is to the right of the left shoulder belt opening 32. The infant carrier has a middle belt opening 29 that allows the middle belt 28 to be inserted through the middle belt opening 29 so that the middle belt connector 27 can connect to the lap belt formed as the right lap belt 25 and the left lap belt 26. The infant carrier also has a right shoulder belt opening 31 and a left shoulder belt opening 32.

The right shoulder belt flap 33 is connected to the middle panel 35 along a right vertical seam. The left shoulder belt flap 34 is connected to the middle panel 35 along a left vertical seam. The right shoulder belt opening 31 is formed on the right vertical seam, and the left shoulder belt opening 32 is formed on the left vertical seam. The right shoulder belt opening 31 is configured to receive the right shoulder belt 21 through the right shoulder belt opening 31 at an upper end of the right shoulder belt opening 31. Left shoulder belt opening 32 is configured to receive the left shoulder belt 22 through the left shoulder belt opening 32 at an upper end of the left shoulder belt opening 32. The right shoulder belt opening 31 extends downwardly to receive the right lap belt 25 at a lower end of the right shoulder belt opening 31. The left shoulder belt opening 32 extends downwardly to receive the left lap belt 26 at a lower end of the left shoulder belt opening 32.

The infant carrier has a carry mode and a car seat mode. While the infant carrier is in the car seat mode, the middle panel 35 lays against the car seat 18. The right shoulder belt clasp 23 fits through the right shoulder belt opening 31. The left shoulder belt clasp 24 fits through the left shoulder belt opening 32. When a user removes the infant carrier from the car seat, without removing the infant from the infant carrier, the middle belt connector 27 is disengaged and retracted from the middle belt opening 29. The right shoulder belt clasp disengages from the left shoulder belt clasp. Then the right shoulder belt clasp 23, the right shoulder belt 21, and the right lap belt 25 are retracted through the right shoulder belt opening 31. Similarly, the left shoulder belt clasp 24, the left shoulder belt 22, and the left lap belt 26 are retracted through the left shoulder belt opening 32.

Figure 7:
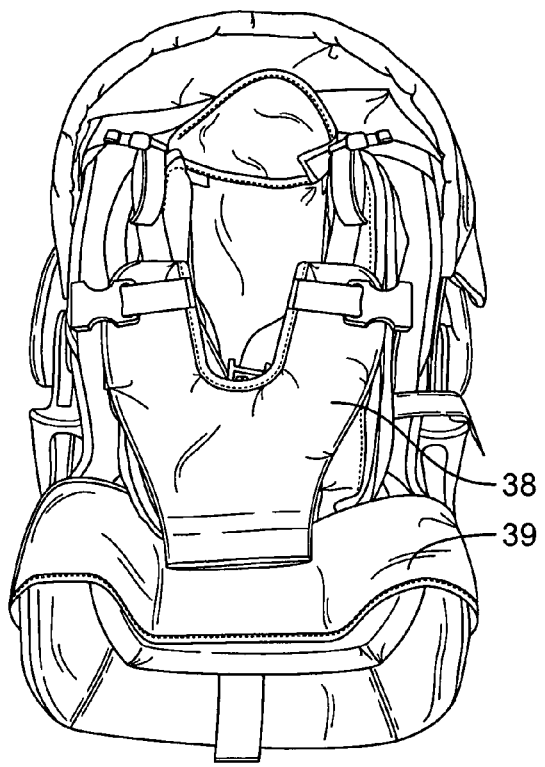
FIG. 7 is a front view of the present invention with the chest panel engaged and the infant carrier installed in the car seat.
Figure 8:
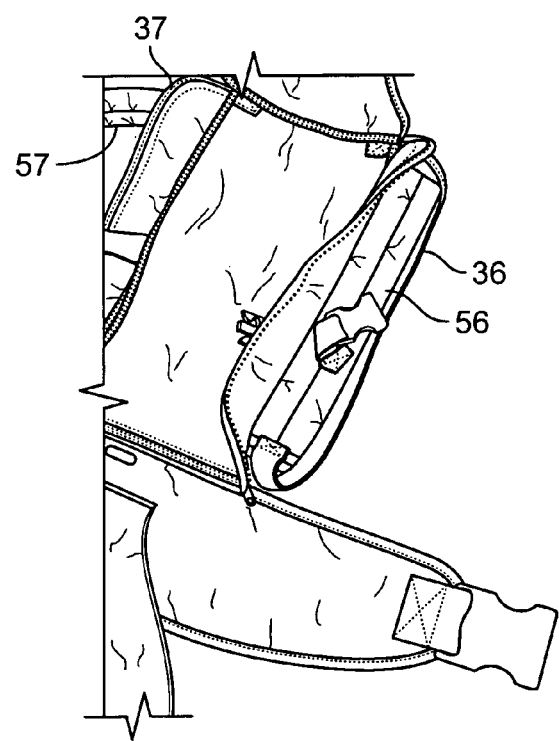
FIG. 8 is a front view of the user shoulder strap flap pocket configuration.
Figure 9:
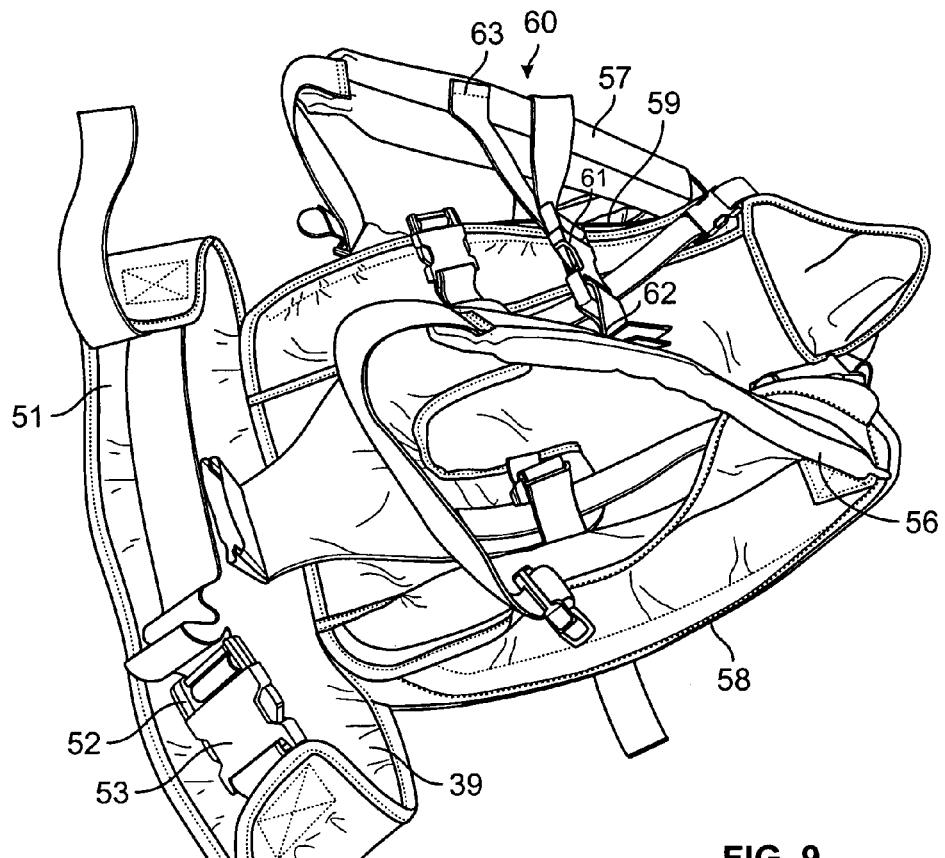
FIG. 9 is a perspective view of the user shoulder strap configuration.
Figure 10:
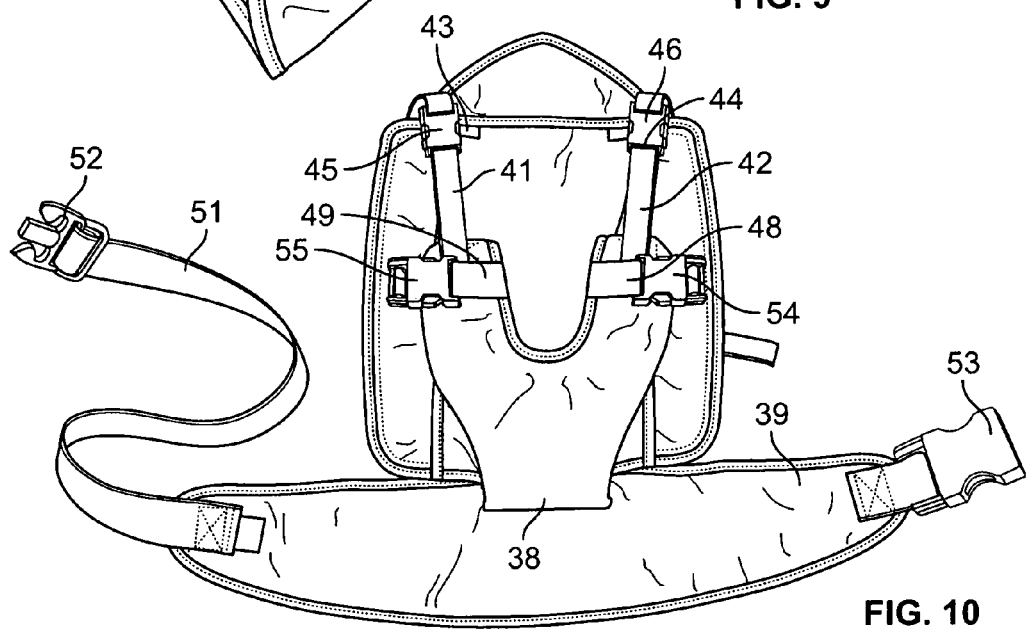
FIG. 10 is a front view of the present invention with the shoulder strap engaged.

After the infant carrier is disengaged from the car seat, the infant carrier can be converted to a carry mode. A total of four connections are made for conversion to carry mode. The four connections include a pair of releasable shoulder connections and a pair of releasable side connections. The conversion to carry mode begins by raising the chest panel 38 shown in the downward position in FIG. 1, up to a raised position shown in FIG. 7. The chest panel 38 preferably has a head cut out gap for opening to provide an area for a bib such as a bib for collecting drool and spit. The legs of the infant or toddler are extended around the lower portion of the chest panel 38. The chest panel 38 has a left side strap second connector 55 that fits to a left side strap first connector 49. The left side strap second connector 55 can be formed as a socket that receives the left side strap first connector 49. Similarly, the right side strap first connector 50 can fit into the right side strap second connector 54. The left shoulder strap second connector 45 can be formed as a socket that receive and connect to the left shoulder strap first connector 43. Similarly, the right shoulder strap first connector 44 can insert and connect to the right shoulder strap second connector 46. Preferably, the left shoulder strap second connector 45 and the right shoulder strap second connector 46 can be stitched to an upper edge of the middle panel 35 on a rear surface of the middle panel 35. A right side strap 48 connects the right side strap first connector 50 the right shoulder belt flap 33. A left side strap 47 connects the left side strap first connector 49 to the left shoulder belt flap 34. The right shoulder strap first connector 44 is attached at a right shoulder strap 42, which in turn is stitched to an upper end of the chest panel 38. The left shoulder strap first connector 43 is also attached at a left shoulder strap 41 two and upper end of the chest panel 38. After the chest panel 30 is engaged, the user can begin attaching the infant carrier converted to carry mode to the user body.

The user first unzips the user shoulder strap flap pockets to access the user shoulder straps which can be folded into the user shoulder strap flap pockets. The user shoulder strap flap pockets are formed on the shoulder belt flaps. The right shoulder belt flap 33 has a user right shoulder strap flap pocket 36. The left shoulder belt flap 34 has a user left shoulder strap flap pocket 37. The flap pockets are closed by pocket zippers when the infant carrier is in the car seat mode. A left pocket zipper 59 is formed on the user left shoulder strap flap pocket 37 and a right pocket zipper 58 is formed on the user right shoulder strap flap pocket 36. The user shoulder straps are larger than the infant shoulder straps. The user shoulder straps include a user right shoulder strap 56 and a user left shoulder strap 57. The user left shoulder strap 57 is stowed in the user left shoulder strap flap pocket 37 and the user right shoulder strap 56 is stowed in the user right shoulder strap flap pocket 36. The left and right user shoulder straps can have buckles for adjusting their length.

The user takes the side panel 39 which is stitched to the middle panel 35 and the chest panel 38 and can use the side panel as a waist belt. The user wears the side panel 39 which is connected to the user waist strap 51 and the user waist strap first connector 52. The user inserts the user waist strap first connector 52 into the socket of the user waist strap second connector 53. Once worn on the user, the infant carrier in carry mode is attached to the user by the pair of user shoulder straps and at the user waist strap 51.

A connector such as a buckle can be used for the upper back shoulder strap connector. The upper back shoulder strap connector 61 connects the upper back shoulder straps 60 to secure the user shoulder straps in case a user bends forward. The upper back shoulder straps connect to the upper back shoulder strap left connection area 62 and to the upper back shoulder strap right connection area 63.

The invention claimed is:

1. A bimodal child carrier comprising:
    a middle panel having a middle panel upper end and a middle panel lower end, wherein the middle panel has a right shoulder belt flap extending from a right side of the middle panel and a left shoulder belt flap extending from a left side of the middle panel;
    a user left shoulder strap attached to the left shoulder belt flap, and a user right shoulder strap attached to the right shoulder belt flap;
    a side panel connected to the middle panel lower end;
    a chest panel connected to the middle panel at the middle panel lower end;
    a left side strap connected to the middle panel, wherein the left side strap terminates in a left side strap first connector; a left side strap second connector connected to the chest panel, wherein the left side strap first connector is configured to releasably connect with the left side strap second connector;
    a right side strap connected to the middle panel, wherein the right side strap terminates in a right side strap first connector; a right side strap second connector connected to the chest panel, wherein the right side strap first connector is configured to releasably connect with the right side strap second connector;
    a right shoulder strap releasably connecting the middle panel upper end to the chest panel; a left shoulder strap releasably connecting the middle panel upper end to the chest panel;
    a right shoulder belt opening defined between the middle panel and the right shoulder belt flap; a left shoulder belt opening defined between the middle panel and the left shoulder belt flap; and
    a middle belt opening formed below the middle panel upper end.

2. The bimodal child carrier of claim 1, wherein the middle belt opening is formed on the side panel.

3. The bimodal child carrier of claim 1, wherein the chest panel has a central cut out with a central cut out left edge and a central cut out right edge, wherein the right side strap connects to the central cut out right edge, wherein the left side strap connects to the central cut out left edge, wherein the right side strap crosses across the right shoulder strap when the right shoulder strap is engaged between the chest panel and the middle panel when the right side strap is engaged between the chest panel and the middle panel, and wherein the left side strap crosses across the left shoulder strap when the left shoulder strap is engaged between the chest panel and the middle panel when the left side strap is engaged between the chest panel and the middle panel.

4. The bimodal child carrier of claim 1, wherein the left shoulder belt flap has a left shoulder strap flap pocket, wherein the left shoulder strap flap pocket holds the user left shoulder strap, wherein the right shoulder belt flap has a right shoulder strap flap pocket, wherein the right shoulder strap flap pocket holds the user right shoulder strap.

5. The bimodal child carrier of claim 4, wherein the left shoulder strap flap pocket has a left pocket zipper, wherein the right shoulder strap flap pocket has a right pocket zipper, wherein the left pocket zipper encloses the left shoulder belt flap within the left shoulder strap flap pocket, wherein the right pocket zipper encloses the right shoulder belt flap within the right shoulder strap flap pocket.

6. The bimodal child carrier of claim 1, wherein either a left or right side of the side panel has a user waist strap connected to it, wherein the user waist strap has a user waist strap first connector that removably connects to a user waist strap second connector, wherein the user waist strap second connector is connected opposite the user waist strap.

7. The bimodal child carrier of claim 6, wherein the middle belt opening is formed on the side panel.

8. The bimodal child carrier of claim 6, wherein the left shoulder belt flap has a left shoulder strap flap pocket, wherein the left shoulder strap flap pocket holds the user left shoulder strap, wherein the right shoulder belt flap has a right shoulder strap flap pocket, wherein the right shoulder strap flap pocket holds the user right shoulder strap.

9. The bimodal child carrier of claim 8, wherein the left shoulder strap flap pocket has a left pocket zipper, wherein the right shoulder strap flap pocket has a right pocket zipper, wherein the left pocket zipper encloses the left shoulder belt flap within the left shoulder strap flap pocket, wherein the right pocket zipper encloses the right shoulder belt flap within the right shoulder strap flap pocket.

10. The bimodal child carrier of claim 9, wherein the chest panel has a central cut out with a central cut out left edge and a central cut out right edge, wherein the right side strap connects to the central cut out right edge, wherein the left side strap connects to the central cut out left edge, wherein the right side strap crosses across the right shoulder strap when the right shoulder strap is engaged between the chest panel and the middle panel when the right side strap is engaged between the chest panel and the middle panel, and wherein the left side strap crosses across the left shoulder strap when the left shoulder strap is engaged between the chest panel and the middle panel when the left side strap is engaged between the chest panel and the middle panel.

11. The bimodal child carrier of claim 10, wherein the middle belt opening is formed on the side panel.

12. The bimodal child carrier of claim 10, wherein the left shoulder belt flap has a left shoulder strap flap pocket, wherein the left shoulder strap flap pocket holds the user left shoulder strap, wherein the right shoulder belt flap has a right shoulder strap flap pocket, wherein the right shoulder strap flap pocket holds the user right shoulder strap.

13. The bimodal child carrier of claim 12, wherein the left shoulder strap flap pocket has a left pocket zipper, wherein the right shoulder strap flap pocket has a right pocket zipper, wherein the left pocket zipper encloses the left shoulder belt flap within the left shoulder strap flap pocket, wherein the right pocket zipper encloses the right shoulder belt flap within the right shoulder strap flap pocket.

* * * * *